A. G. BOGGESS.
TRAP DOOR LIFT.
APPLICATION FILED NOV. 17, 1908.

936,294.

Patented Oct. 12, 1909.
2 SHEETS—SHEET 1.

Witnesses

Inventor
A. G. Boggess,
By
Attorneys

A. G. BOGGESS.
TRAP DOOR LIFT.
APPLICATION FILED NOV. 17, 1908.

936,294.

Patented Oct. 12, 1909.
2 SHEETS—SHEET 2.

Witnesses

Inventor
A. G. Boggess,

By
Attorneys

UNITED STATES PATENT OFFICE.

ALBERT G. BOGGESS, OF SIOUX CITY, IOWA, ASSIGNOR OF ONE-HALF TO HERMAN H. CHURCHILL, OF RENSSELAER, INDIANA.

TRAP-DOOR LIFT.

936,294.  Specification of Letters Patent.  Patented Oct. 12, 1909.

Application filed November 17, 1908. Serial No. 463,123.

*To all whom it may concern:*

Be it known that I, ALBERT G. BOGGESS, citizen of the United States, residing at Sioux City, in the county of Woodbury and State of Iowa, have invented certain new and useful Improvements in Trap-Door Lifts, of which the following is a specification.

The present invention relates to certain new and useful improvements in trap doors such as are employed in connection with elevators, and the object of the invention is the provision of a novel means for controlling the trap door and enabling it to be readily opened and closed and retained in either position.

The invention further contemplates a device of this character which is simple and durable in its construction, will operate effectively in connection with all kinds of swinging trap doors, and which can be adjusted to accommodate itself to both light and heavy doors as required.

Figure 1:
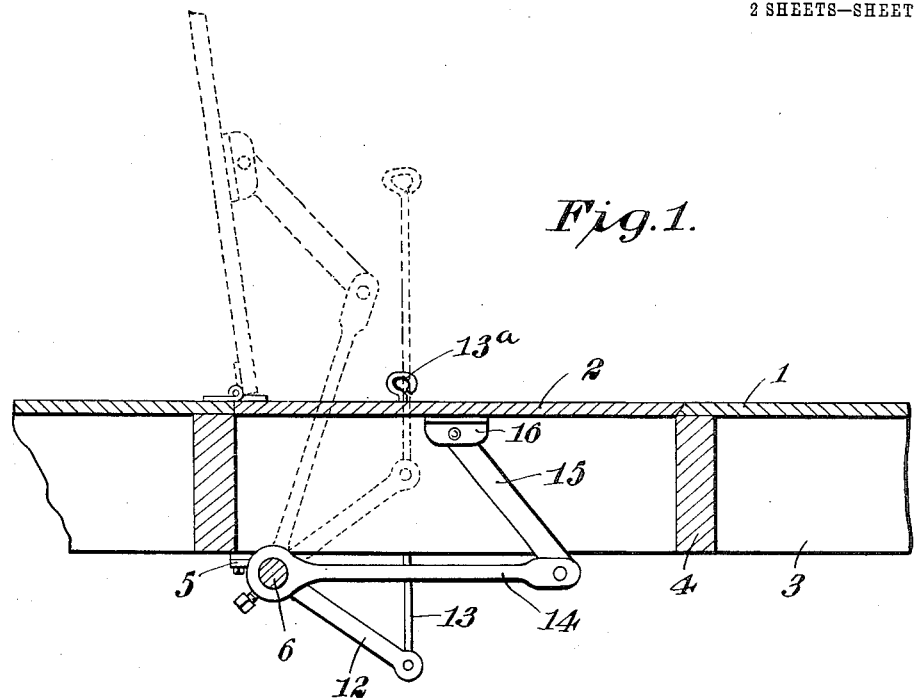
Figure 2:
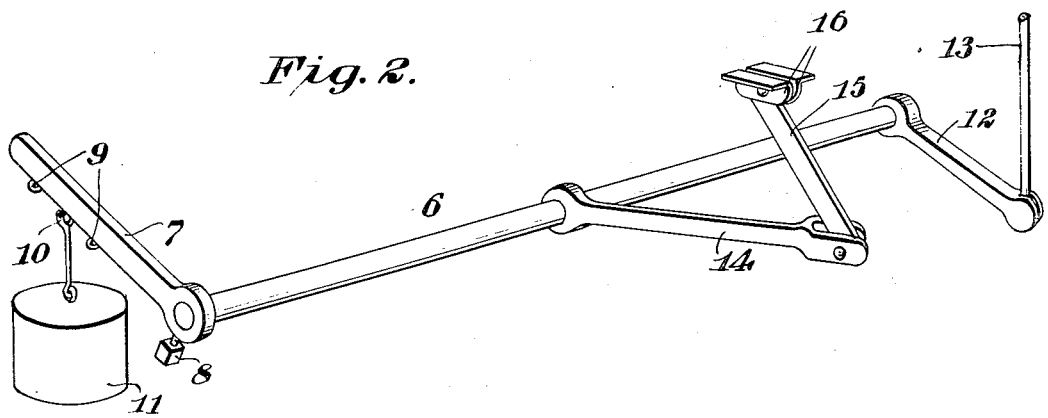
Figure 3:
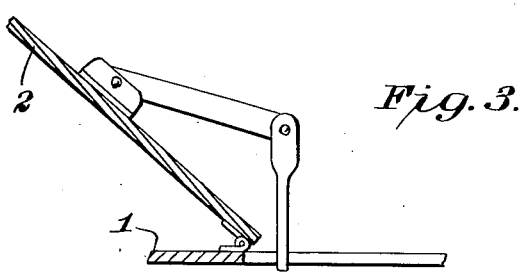
Figure 4:
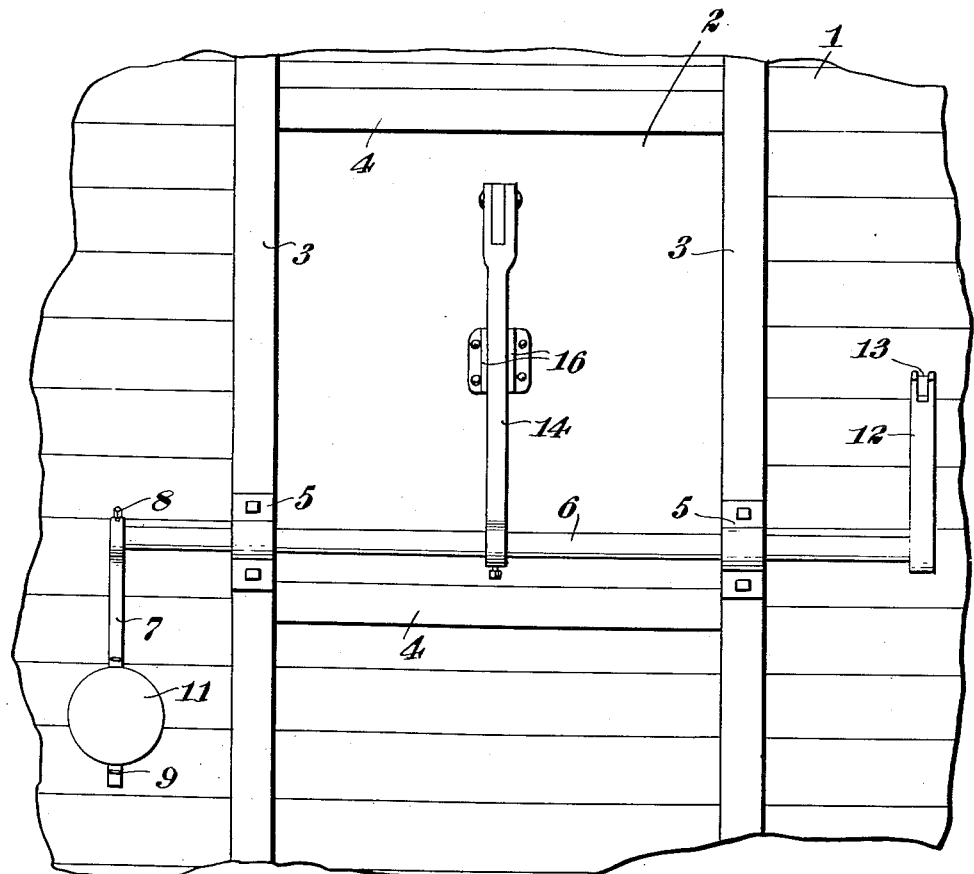

For a full understanding of the invention and the merits thereof and also to acquire a knowledge of the details of construction and the means for effecting the result, reference is to be had to the following description and accompanying drawings, in which:

Figure 1 is a vertical longitudinal sectional view through a trap door embodying the invention, the door being shown in a closed position in full lines and in an open position in dotted lines, Fig. 2 is a detail view of the rock shaft for opening and closing the trap door, Fig. 3 is a vertical sectional view through the trap door when in an open position, and, Fig. 4 is a bottom plan view of the trap door.

Corresponding and like parts are referred to in the following description and indicated in all the views of the drawings by the same reference characters.

Referring to the drawings, the numeral 1 designates a floor which is provided with a trap door opening adapted to be closed by a swinging trap door 2, one edge of the door being hinged to the floor while the remaining edges are beveled so as to form a close joint when the door is closed. Extending longitudinally under the floor upon both sides of the trap door opening therein, are the longitudinal beams 3 and these beams are connected by the transverse beams 4 which are arranged at the opposite ends of the trap door opening. Applied to the longitudinal beams 3 are the bearings 5 within which the trap door operating shaft 6 is journaled, the said shaft being located under the hinged end of the trap door and being parallel with the axis about which the trap door is mounted to swing.

Loosely mounted upon one end of the shaft 6 is a lever 7, a set screw 8 being provided for clamping the lever in an adjusted position. This lever is provided with a series of eyes 9 any selected one of which may be engaged by a hook 10 projecting upwardly from a weight 11. The opposite end of the shaft 6 is provided with a laterally extending arm 12, the extremity of which is loosely connected to a plunger or operating rod 13 extending upwardly through the floor 1 and terminating in a handle 13ª.

Projecting laterally from an intermediate portion of the shaft 6 is a crank arm 14 which is located under the trap door 2 and has the extremity thereof loosely connected by means of a link 15 to a pair of ears 16 projecting downwardly from the central portion of the trap door. The weight 11 upon the lever 7 normally tends to revolve the shaft 6 within its bearings so as to swing the crank arm 14 upwardly and open the trap door. It will be observed however, that when the trap door is closed the crank arm 14 has a substantially horizontal position and the link 15 is inclined toward the hinged end of the trap door so that the thrust tending to open the door has a comparatively small leverage and is overcome by the weight of the trap door itself. As the trap door is swung upwardly however, the link 15 is swung about the end of the crank arm 14 so that the thrust produced by the weight is given a constantly increasing leverage. The parts are so arranged that by pulling upwardly upon the handle 13ª and opening the trap door a slight amount, the thrust of the link 15 will be given a sufficient leverage to complete the opening of the trap door and to retain it in an open position. In a somewhat similar manner when the trap door is being closed, the thrust of the link 15 has a continuously decreasing leverage and when the trap door has been completely closed the weight of the door itself more than counteracts the thrust of the link so that the door remains in a closed position. It will thus be apparent that by drawing the handle 13ª up or pushing it down, the trap door may either be opened or closed as desired and it will remain at either limit of its movement but not at an intermediate position. Attention may be here directed to the fact that by properly adjusting the weight 11 upon the lever 7, the device may be caused to operate effectively in connection with either a light or a heavy trap door.

Having thus described the invention, what is claimed as new is:

1. In a device as specified the combination with a floor and a trap door disposed in hinged relation adjacent an opening through said floor of bearings disposed in transverse alinement against the under side of the floor beneath the hinged edge of said door, a shaft mounted in said bearings, an arm adjustably disposed on one end of said shaft, a weight adjustably depended from said arm, a lever carried upon the opposite end of said shaft, a rod pivotally engaged in the outer end of said lever and extended upwardly therefrom through said floor for engagement by the operator, a second lever adjustably positioned intermediately of said shaft and extended outwardly therefrom and a link disposed between the outer end of said second lever and a point at the underside of said door inwardly of the end of said second lever.

2. In a device as specified the combination with a floor and a trap door hingedly disposed therein of a shaft transversely disposed beneath the hinged end of said door, a lever outwardly extended from said shaft, a link connected between the end of said lever and a point on said door inwardly of the end of said lever, an arm laterally disposed from said shaft, a weight on said arm and a rod connected to said shaft and extended upwardly through said floor for operating said shaft to raise and lower said door.

In testimony whereof I affix my signature in presence of two witnesses.

ALBERT G. BOGGESS. [L. S.]

Witnesses:
W. W. COOK,
J. H. VAN HAAHN.